United States Patent
Lee et al.

(10) Patent No.: US 6,931,696 B2
(45) Date of Patent: Aug. 23, 2005

(54) MULTI-PURPOSE BUCKLE SENSOR ASSEMBLY

(75) Inventors: Jae Ho Lee, Seoul (KR); Chan Woo Choi, Seong-Nam (KR)

(73) Assignee: Delphi Automotive Systems Sungwoo Corporation, Kangwon-Do (KR)

( * ) Notice: Subject to any disclaimer, the term of this patent is extended or adjusted under 35 U.S.C. 154(b) by 16 days.

(21) Appl. No.: 10/666,520

(22) Filed: Sep. 22, 2003

(65) Prior Publication Data

US 2004/0111845 A1 Jun. 17, 2004

(30) Foreign Application Priority Data

Sep. 18, 2002 (KR) ................................ 10-2002-0056998
Sep. 18, 2002 (KR) ................................ 10-2002-0056995

(51) Int. Cl.⁷ ............................................. A44B 11/26
(52) U.S. Cl. ............................ 24/633; 24/640; 24/642; 24/654
(58) Field of Search ........................ 24/633, 642, 645, 24/640; 180/270, 286; 280/801.1

(56) References Cited

U.S. PATENT DOCUMENTS 5,749,130 A * 5/1998 Bilyeu et al. ................. 24/633
5,960,523 A * 10/1999 Husby et al. ................. 24/633
6,076,239 A * 6/2000 Kopetzky et al. ............. 24/633
6,474,435 B1 * 11/2002 Devereaux .................... 24/633
2004/0107550 A1 * 6/2004 Lee et al. ..................... 24/633

FOREIGN PATENT DOCUMENTS

EP   1 077 037   2/2001
EP   1 078 828   2/2001

* cited by examiner

Primary Examiner—Robert J. Sandy
(74) Attorney, Agent, or Firm—Jacobson Holman PLLC

(57) ABSTRACT

A multi-purpose buckle sensor assembly includes a hall sensor portion including a hail sensor and a printed enclosed in one package; a base plate including a metal pattern with a plurality of terminal portions for control and power lines formed in a predetermined pattern and a supporting plate including a plurality of terminal seats for connecting the connecting ends of control and power lines to the terminal portions; a movable member including at least two contact terminals for generating various control and a terminal block made of a heat-melted material in the form of a fork having three branches at the front portion and including at least one branch enclosing the connecting ends of the control and power lines electrically coupled to each other with the control terminal portions in corresponding power terminal seats, in which the hall sensor portion is cooperated with a buckle assembly.

5 Claims, 6 Drawing Sheets

MULTI-PURPOSE BUCKLE SENSOR ASSEMBLY

BACKGROUND OF THE INVENTION

1. Field of the Invention

The invention is related to providing a seatbelt buckle mounted in a vehicle, and particularly, to providing a multi-purpose buckle sensor assembly including a contact switch and a non-contact switch integrated into one body to detect the locking state and unlocking state of the seatbelt buckle at the same time.

2. Prior Arts

A conventional vehicle buckle is provided with a seatbelt, with which is mounted to a proper place in a vehicle. As being worn by an occupant, the seatbelt passes through and hangs on predetermined positions, for example three points, terminates into the buckle with a tongue connected to its end to be supported. The buckle is known to promote the safety of occupants in an abnormal condition.

The safety seatbelt buckle is supposed to identify on whether a driver and/or an occupant wears the seatbelt. The seatbelt buckle normally includes a mechanical switch such as a micro-switch to be operated with the tongue, together. Therefore, the micro-switch turns on or off in response to the insertion of the tongue thereinto, so that a warning lamp mounted on an instrument panel is lightened or put out to warn the non-wearing of the seatbelt to a driver and/or an occupant.

The safety seatbelt buckle further can include a non-contact switch such as a hall sensor to perform a self-diagnostic function of an electronic control unit such as ECU. Upon the seatbelt non-wearing of the occupant, the non-contact switch detects the abnormal states of the vehicle to force all warning lamps on the instrument panel to be lightened, while it enables the execution of the proper measures related to the traveling of the vehicle such as the limitation of a speed, the ready state for the operation of an airbag, etc. thereby enhancing the efficiency of a vehicle control.

But, the safety seatbelt buckle is configured so that the contact and/or non-contact switches are respectively or together mounted therein to recognize its locking state or non-locking state with being separated from each other. The configuration makes the mutual separated contact and non-contact switches mounted on their proper positions, mainly the bottom surface of a lower case, so the contact and/or non-contact switches are switched in response to the insertion of a tongue into the buckle in a predetermined lapse interval.

For example, a latch, an ejector or a moving member mounted in the buckle to be co-operated with the tongue operates these contact and/or non-contact switches. It means that their mounting place is limited and a separate mounting space is secured. Furthermore, the configuration may cause the malfunction of the switches due to the wrongly insertion of the tongue into the buckle.

In order to resolve these problems, the adoption of a non-contact switch is disclosed in U.S. Pat. No. 5,960,523 (Oct. 5, 1999) which is related to a seat belt buckle sensor. A sensor is used to monitor the presence and position of the tongue either directly or by measuring motion of the latch. For example, the full range of motion of the latch, both in its up and down motion and in its lateral motion in response to the seat belt tension, can be monitored by placing a small magnet on the latch and measuring the magnetic field intensity at a suitable location fixed with respect to the seat belt buckle. The sensor within integrated circuit package is mounted to a fixed portion of a latch follower spring support, which also encloses the guide plate of the latch. Therefore, the magnet is moved along with the latch to be cooperated with the sensor.

Another typical technology is disclosed in U.S. Pat. No. 6,076,239 (Jun. 20, 2000), which is related to a seat belt buckle with slide sensor. The seat belt buckle comprises a belt lock for a safety belt that includes a frame, a latching element for the latching of the belt tongue and a securing element, which secures the latching element in the latched state. A detector device is provided at the belt lock which detects the position of the securing element. The detector device has a hall probe and a magnet secured to the securing element. The hall probe and the magnet only lie close to and opposite one another when the securing element is located in its closed end position. Therefore, the detector device detects the position of the securing element.

But, these seat belt buckles include only one non-contact switch. For it, it has a disadvantage in being not usable for various purposes. Especially, it must sacrifice the feature of quickly warning the non-wearing of a seatbelt to an occupant in using a contact switch or of applying a control signal to an electronic control unit for a self-diagnostic function in using a non-contact switch. Therefore, it is preferable if the advantages of the contact and non-contact switches are used.

In order to use these advantages, to a seatbelt buckle disclosed in European Patent Application EP1088037A2, a locking state detecting apparatus of a vehicle's buckle detected in European Patent Application EP107882A1 can be adapted as follows:

The seatbelt buckle includes a body frame, a release button slidably coupled to the body frame for unlatching a seatbelt tongue from the seatbelt buckle, a locking lever capable of being pivotally rotated about wings by a predetermined angle, a slider for supporting and fixing the locking lever and an ejector for pushing the tongue in a longitudinal direction which is a lengthwise direction of the body frame. The body frame has an arch-shaped supporting beam which is integrally formed with the body frame in a manner such that the supporting beam is elected in a vertical direction. The supporting beam serves to limit movement of the slider and increase structural rigidity of the seatbelt of the seatbelt buckle. The slider has a width, which is greater than that of the body frame, and possesses shock-absorbing means for increasing durability of the seatbelt buckle. The release button has at least two release projections, which are formed with inclined surfaces that are in turn brought into contact with the inclined projections of the sliders.

In the seatbelt buckle, there may be mounted a locking state detecting apparatus of EP107882A1, in which a contact switch and a non-contact switch are mounted on the inner right and left surfaces of the seatbelt buckle, respectively, adjacent to both sides of the body frame.

The seatbelt buckle is positioned in a lower case so that the tongue inserted is not escaped therefrom. For example, as the tongue is pushed into an inserting opening formed in the body frame, an ejector mounted in a slidably opening of a bottom plate is moved rearward. A locking lever, which is positioned on an upper end of the body frame and elastically supported by a spring, is rotated downward about wings to let a latch bar to be locked to the tongue.

At that time, the ejector forces ends projected from its both sides and out of the body frame to operate the contact and non-contact switches at once. The contact switch such as a micro-switch called "mechanical switch" is turned on to interrupt a power source applied to a warning lamp, so it means that the non-wearing of a seat belt is not warned for occupants. The non-contact switch such as a multi-purpose buckle sensor assembly including a hall sensor and a permanent magnet is operated to detect the insertion of the tongue according to the approaching of the permanent close thereto, so that it supplies detecting signals to an electronic control unit (ECU) constituted as part of a vehicle control portion to perform the self-diagnostic function.

Nevertheless, the configuration shows that the contact and non-contact switches are mounted in the lower case to be separated from each other and their corresponding wirings are separated from each other. For it, their mounting is not easy and additional space for their mounting is required. t is difficult to mount the contact and non-contact switches at one place with a good space efficiency and operate them cooperating with the buckle.

Therefore, the configuration causes the contact and non-contact switches to have different operating time points, so it can't make an expression that they are operated with the buckle assembly at the same time. The configuration is not proper for a multi-purpose buckle sensor assembly to which the invention is adapted, which is integrated into one unit. Herein, it is noted that the unified multi-purpose buckle sensor assembly enhances the self-diagnostic function of the electronic control unit in a vehicle.

SUMMARY OF THE INVENTION

Accordingly, an object of the invention is to provide a multi-purpose buckle sensor assembly including a contact switch and a non-contact switch integrated into one unit to detect the locking or unlocking state of a buckle assembly.

Other object of the invention is to provide a multi-purpose buckle sensor assembly including a contact switch and a non-contact switch integrated into one unit to control a warning lamp, quickly, and generate a control signal of an electronic control unit according to the locking or unlocking state of a buckle assembly at the same time.

Another object of the invention is to provide a multi-purpose buckle sensor assembly including a contact switch and a non-contact switch integrated into one unit to generate at least one control signal and to be used for multi-purpose according to the locking or unlocking state of a buckle assembly According to the invention, a buckle assembly comprises an upper case, a lower cases coupled with the upper case and including a position determining projection for determining the position of a multi-purpose buckle sensor assembly, ribs for supporting the front portion of the multi-purpose buckle sensor assembly and first and second supporting blocks each positioned on the front portion of a terminal block and inserted in a groove portion of the terminal block, a release button coupled to the frame for unlatching a locking bar of a locking lever from a tongue, an ejector elastically and movably supported in a sliding aperture for discharging the tongue latched to a locking bar of a locking lever out of outside responsive to the release button, the locking lever including a slider elastically and movably mounted on a guide surface thereof and for being pivoted at one end portion and latching or unlatching the tongue at the other end portion, a frame including a coupling groove for determining the position to be coupled with the multi-purpose buckle sensor assembly and a coupling surface to be engaged with a hook portion of a base plate and for supporting the ejector on a bottom thereof, supporting the slider against the inner upper surface of an arched supporting beam thereof and pivotally rotating the locking lever at its rear end, in which:

a multi-purpose buckle sensor assembly comprises a hall sensor portion including a hall sensor and a printed circuit board electrically connected to each other which are enclosed in one package, a base plate electrical connected at one end portion to the printed circuit board and at the other end to a cable having control lines and power lines and a supporting plate integrated on the upper surface thereof, a movable member freely moving on the base plate and including a first permanent magnet mounted at its center portion and a pair of contact terminals contacted with the metal pattern and a terminal block including the control lines and power lines contained therein and means for determining the position of the multi-purpose buckle sensor assembly and fixing it in the lower case; the lower case including means for determining the position of the multi-purpose buckle sensor assembly and fixing it thereon; the frame including means for determining the position of the multi-purpose buckle sensor assembly and fixing it thereto; and a second permanent magnet mounted on the center of the ejector to be cooperated with the hall sensor.

BRIEF DESCRIPTION OF THE DRAWINGS

The invention now will be described in detail with reference to the accompanying drawings, in which.

DETAILED DESCRIPTION OF THE INVENTION

Figure 1:
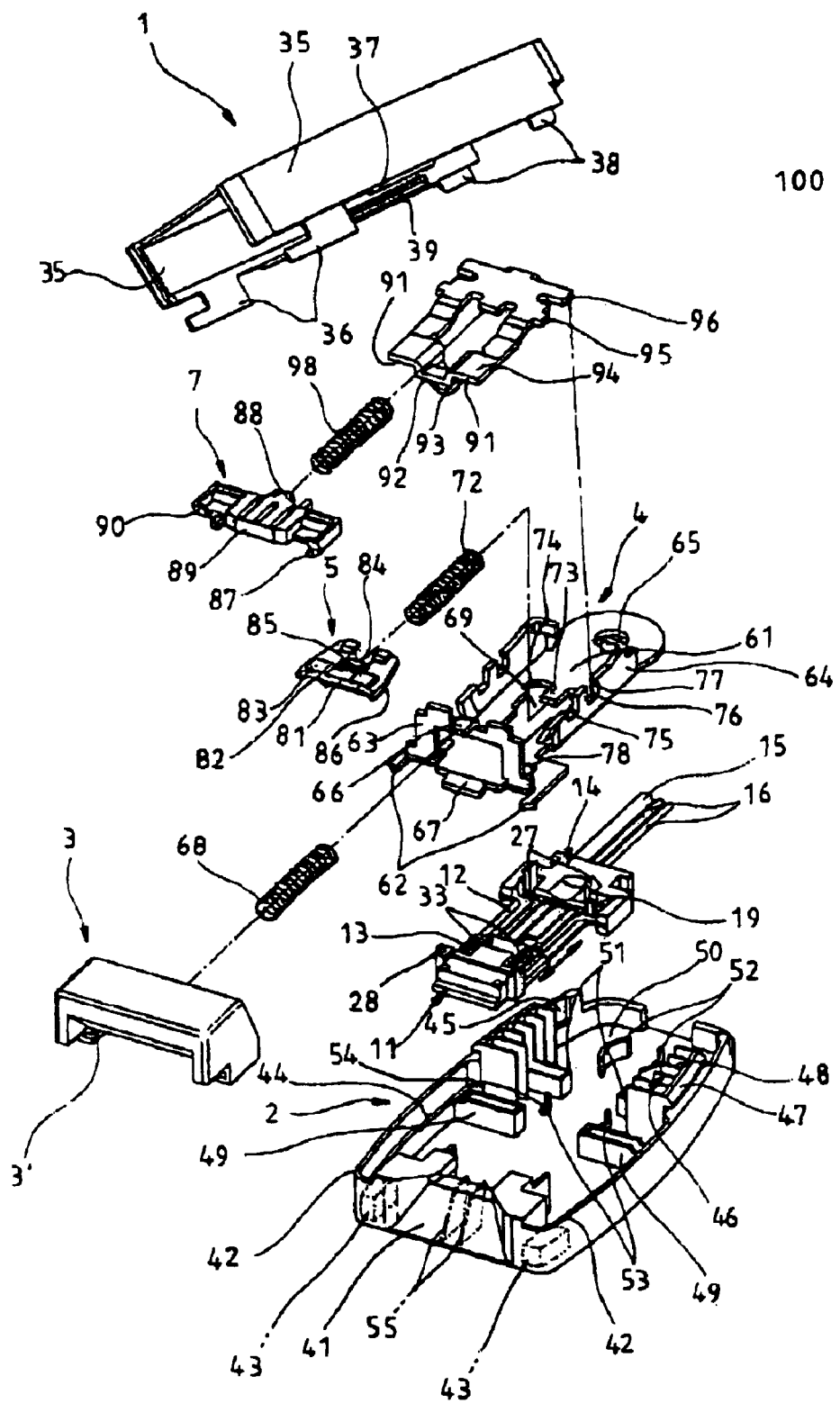
FIG. 1 is an exploded perspective view illustrating a buckle assembly to be cooperated with a multi-purpose buckle sensor assembly mounted in a lower case according to the invention.

Referring to FIG. 1, a seatbelt buckle apparatus 100 includes an upper case 1 and a lower case 2 containing a buckle assembly and a multi-purpose buckle sensor assembly therein, which are coupled to each other The lower case 2 receives the buckle assembly which includes a release button 3 fixed to a frame 4, an ejector 5 slidably mounted on a bottom plate of the frame 4, a locking lever 6 pivotally mounted on the upper portion of frame side walls to be coupled with a tongue and a slider 7 movably mounted on the locking lever 6, which are integrally assembled into each another.

First, the multi-purpose buckle sensor assembly 10 will be explained for the purpose of helping the understanding of the invention. The multi-purpose buckle sensor assembly 10 includes a hall sensor portion 11 packaged with a hall sensor and a printed circuit board, a base plate 12 including a metal pattern 23 in a predetermined form fixed thereon and having a good electric conduction, a movable member 13 movably mounted on the base plate 12 with a pair of contact terminals being mounted on its lower surface to be contacted with the metal pattern and a terminal block 14 having control lines and power lines electrically coupled through the metal pattern to the base plate 12.

Figure 3:
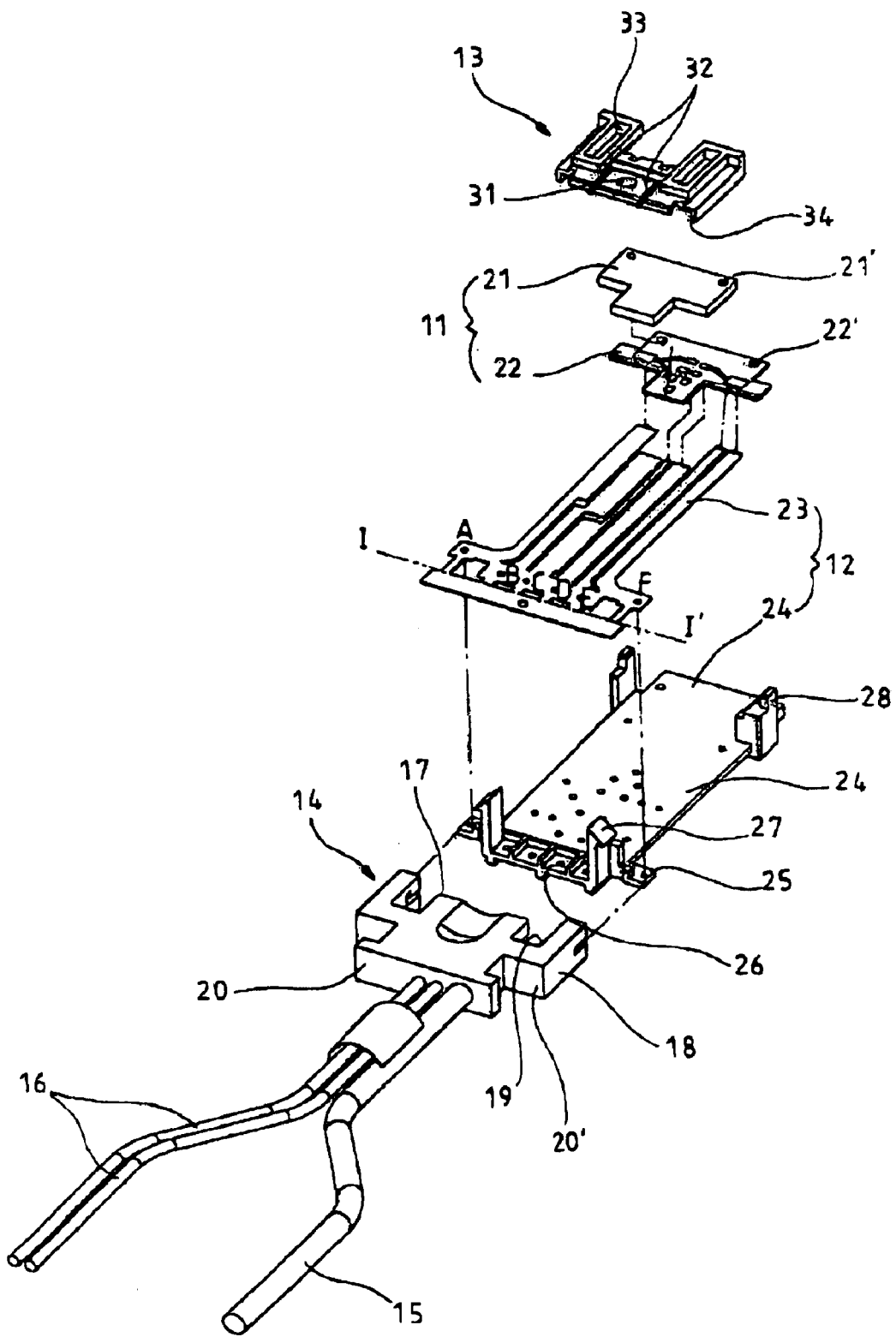
FIG. 3 is an exploded perspective view illustrating a multi-purpose buckle sensor assembly according to the invention.

As shown in FIG. 3, the hall sensor portion 11 includes a hall sensor 21 and a printed circuit board 22 having an electrical circuit connected with the hall sensor 21, which are enclosed in one package. When the hall sensor 21 is cooperated with a permanent magnet to generate control signals, the control signals are applied to at least one predetermined terminal of the metal pattern 23 connected to the printed circuit board 22 and then through a cable 15 having at least one control line to an electronic control unit. The power lines 16 are for positive and negative voltages to be supplied to a system, the power of which is used to lighten or put out a warning lamp mounted on an instrument panel according to the movement of the movable member 13 on the metal pattern 23.

The base plate 12 includes the metal pattern 23 and a supporting plate 24, in which the metal pattern 23 includes terminal portions A, B, C, D, E and F respectively patterned in a predetermined shape. The terminal portions A and F are for a positive power source (+) and a negative power source and the terminal portions B, C, D and E are for a control signal of the electronic control unit, for example the terminal portion E corresponding to ground and other terminal portions corresponding to control signal terminals. Besides, a dotted line I–I' is cut after the metal pattern 23 is fixed to the supporting plate 24 and the terminal portions A~F are connected to the connecting end of the control lines and power lines. The supporting plate 24 includes power terminal seats 25 and control terminal seats 26 formed adjacent a terminal block 14, to which the connecting ends of the control lines and the power lines are electrically coupled along with the terminal portions A~F, selectively. Hook portion 27 are integrally projected from both front side surfaces of the supporting plate 28 adjacent the all sensor portion 13, and positioning members 27 are integrally projected from the supporting plate 24 facing to both rear side surfaces of the control terminal portions B~E, so that the base plate 12 is fixed to the lower surface of the frame 4.

The movable member 13 includes a first permanent magnet 31 mounted at its center, a pair of contact terminals 32 mounted on its lower surface opposite the metal pattern 23, a groove portion 33 formed adjacent both sides thereof, into which a pair of leg portions of the ejector 5 are fitted, and a guider 34 formed to allow the movable member 13 to be moved on the base plate 12. Therefore, the movable member 13 enables the cooperating of the hall sensor 21 with the first permanent magnet 31 as well as the selection of the contact terminals 32 to predetermined terminals of the metal pattern 24. Therefore, the hall sensor 21 generates control signals for the electronic control unit, and the contact terminals 32 perform the supply or interruption of the power to the warning lamp.

The terminal block 14 is configured to have upper and lower portions forming a hollow at its center, which are made of a heat-melted material at a lower temperature, and heat-molded along with the cable 15 and the power lines 16 contained therein. The terminal block 14 is made in the form of a fork having three branches at the front portion. A middle portion 17 is enclosed containing the connecting ends of the control lines and the control terminal portions B~E connected to each another, which are positioned in the corresponding power terminal seats 26. Both projecting portions 18 constituted as outer branches are enclosed containing the connecting ends of the power lines and the power terminal portions A and F connected to each another, which are in the corresponding terminal seats 25. The projecting portion 18 is horizontally projected at the approximate middle portion of the terminal block 14 in a lengthwise and then extended forward. Therefore, between the middle portion 17 and the projecting portion 18 there is formed a space in the form of a groove. The hook portion 27 is positioned in the space to form a hole 19 for determining the mounting position of the multi-purpose buckle sensor assembly 10. The terminal block 14 also includes extensions 20 extended from both rear sides thereof to form a groove portion 20' for coupling with the multi-purpose buckle sensor assembly 10.

Figure 4:
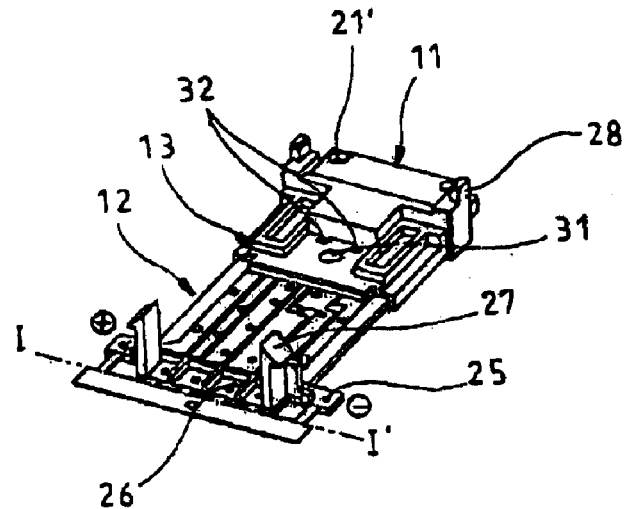
FIG. 4 is an exploded perspective view illustrating the partly assembly of a multi-purpose buckle sensor assembly according to the invention.
Figure 5:
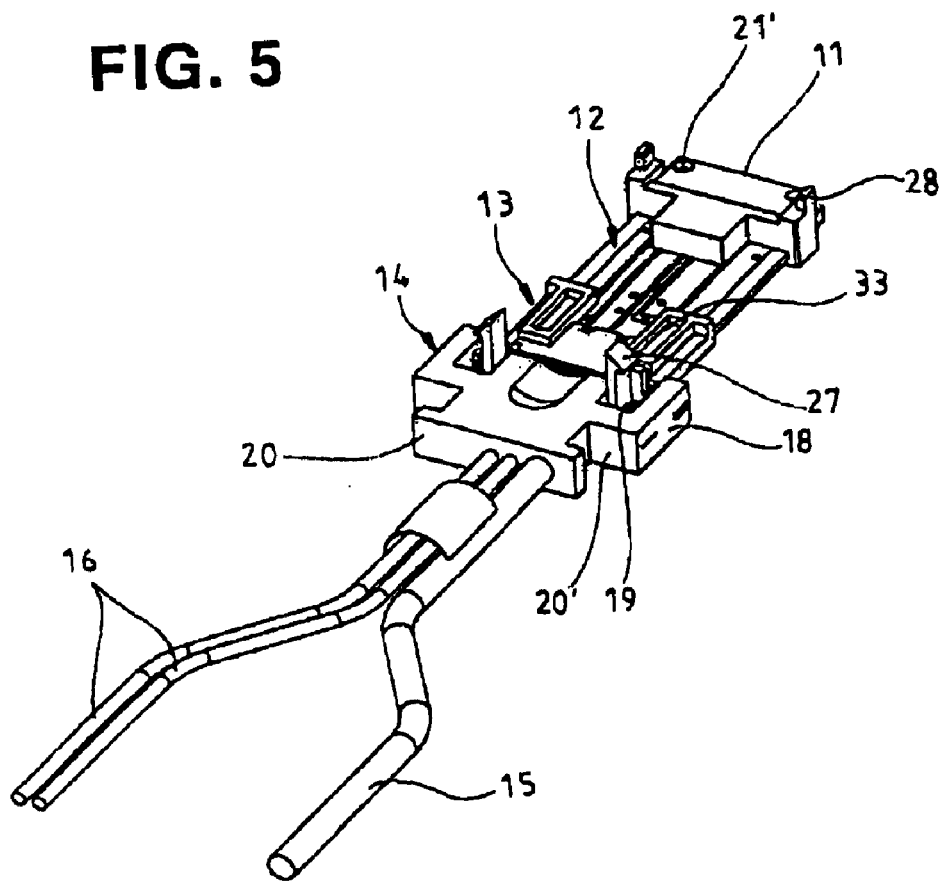
FIG. 5 is an exploded perspective view illustrating the assembly of a multi-purpose buckle sensor assembly according to the invention; and, FIGS. 6A and 6B are cross-sectional views illustrating the operating of a multi-purpose buckle sensor assembly mounted in a lower case operating together with a buckle assembly according to the invention.

As shown in FIGS. 4 and 5, the multi-purpose buckle sensor assembly 10 is constructed to assemble other parts on the base plate 12. In other words, the base plate 12 is constructed to fix the metal pattern 23 to the supporting plate 24. Before preceding this work, the printed circuit board 22 is electrically connected to the metal pattern 23 in a predetermined electric arrangement, and then the hall sensor 21 is electrically coupled to the printed circuit board 22 to establish a predetermined control circuit. Thereafter, the hall sensor 21 is made into one unit with the printed circuit board 22 using coupling holes 21' and 22' in one package form. The dotted line I–I' is cut out. The terminal block 14 is enclosed and heat-treated for its shape containing the connecting ends of the control lines and the power lines and the control along with the terminal portions A~F connected to one another, which are positioned in the corresponding power terminal seats 26.

Referring to FIG. 1, again, the upper case 1 is opened at its front surface and includes sidewalls 35 extended downward from the upper portion thereof. Clamps 36, a first supporting end portion 37 and a second supporting end portion 38 are formed projecting from the front, middle and rear of the sidewalls 35. A hook insert groove 39 is formed on the inner surface of the sidewalls 35.

The lower case 2 is constructed to force the multi-purpose buckle sensor assembly 10 to be positioned and received therein. A front wall 41 has a space (called "insertion opening" below) between a release button and it for the insertion of a tongue and clamp grooves 43 formed in corner portions adjacent the front wall for the fitting of the clamp 36 thereinto. Both sidewalls 42 includes first and second supporting grooves 44 and 45 respectively formed on the thickness thereof at the middle and rear ends corresponding to the first and second supporting end portions 37 and 38. A hook-fixing portion 46 is integrated on inner surfaces of both sidewalls 42 between the first and second supporting grooves 44 and 45 to be engaged with the hook grooves 39, respectively. The hook-fixing portion 46 includes a hook 47 positioned to have a height a little higher the sidewalls 42 at the upper end and a plurality of ribs 48 extended toward the inner portion of the lower case 2 to have at least one different width from each another in a group. A first supporting block 49 is integrally extended on a bottom 50 from the approximate middle portion of the sidewalls 42 to be positioned at the front surface of the terminal blocks 14 and contacted with the side of the base plate 12. The second supporting block 51 is extended on the bottom 50 from a pair of rib 48 having a smaller width to be fitted into the groove portion 19. The first and second supporting blocks 49 and 51 have a height equal to that of the terminal block 14 in the form of a rectangular body to reinforce the sidewalls 42 and the bottom 50.

On the bottom 50, a position determining projection 53 is formed between the first and second supporting blocks 49 and 51 to be fitted into the hole 19, which determines the mounting position of the multi-purpose buckle sensor assembly 10 and prevents its rocking. Guide walls 52 are formed behind the second supporting block 51 on the bottom 50 in an arc shape to be opposite to each other. A shoulder 54 having a little wider area is formed below the position determining projection 53 to support the base plate 12 contacting therewith.

Figure 2:
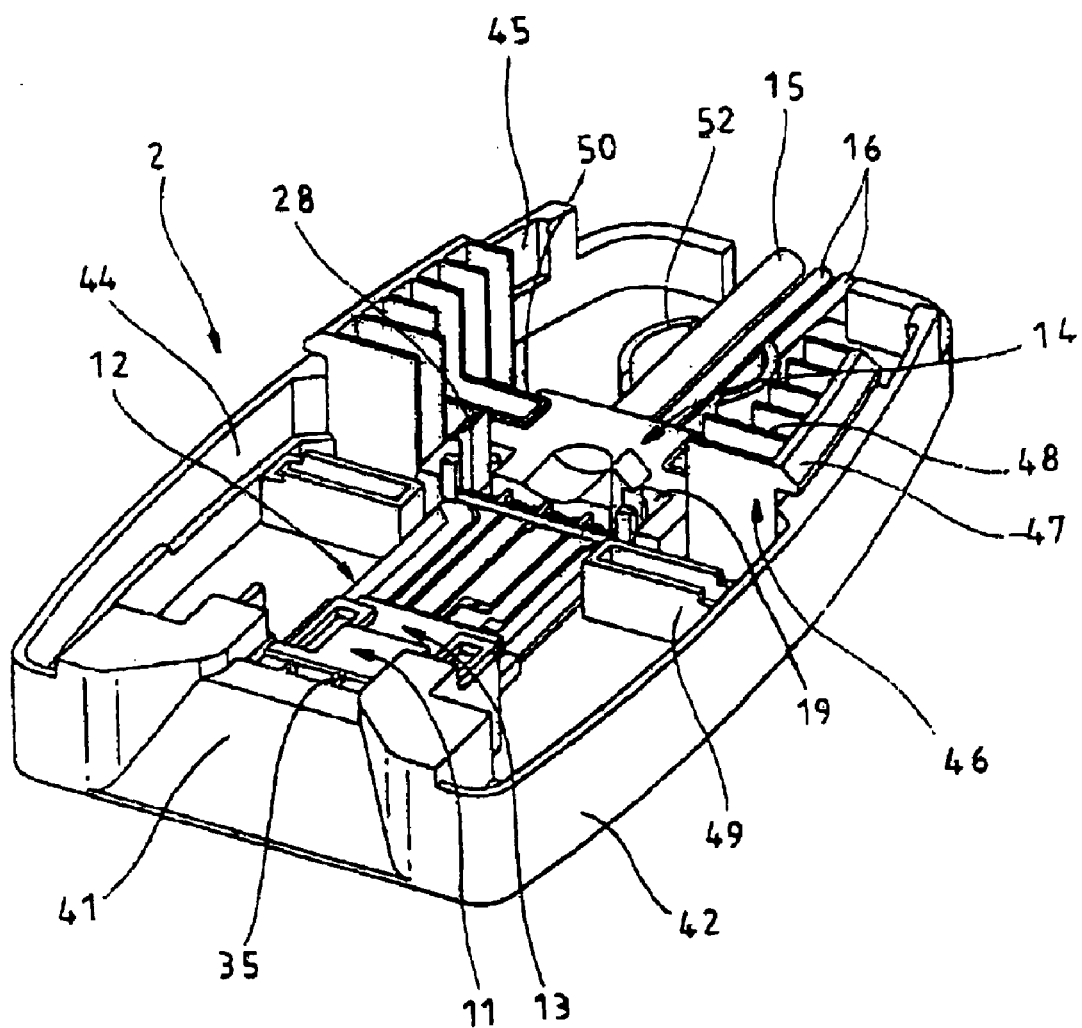
FIG. 2 is an upper perspective view illustrating a multi-purpose buckle sensor assembly mounted in a lower case according to the invention.

Therefore, as shown in FIG. 2, when the upper case 1 is coupled with the lower case 2, the multi-purpose buckle sensor assembly 10 is first positioned on the bottom 50. The multi-purpose buckle sensor assembly 10 is positioned by the reference of the position determining projection 53 in a manner that the position determining projection 53 is fitted into the hole 19 of the terminal block 14 and its shoulder 54 is contacted with the lower surface of the base plate 12 to secure a predetermined gap between the bottom 50 and the base plate 12. At that time, the front end of the hall sensor portion 14 is supported contacting with the reinforcing ribs 55. The first supporting block 49 supports the base plate 12 contacting with both side surfaces of the base plate 12 adjacent the front-end portion of the terminal block 14, and the second supporting block 51 supports the terminal block 14 with its front end portion being fitted into the groove. The control line cable 15 and power lines 16 connected to the terminal block 44 extend outside passing through the guide walls 52.

Additionally, the lower case 2 is coupled with the upper case 10 after the buckle assembly is coupled with the multi-purpose buckle sensor assembly 10 to be cooperated with each other. For example, the clamp 13 is inserted into the clamp groove 43, and the first and second supporting end portions 37 and 38 are respectively contacted with the first and second supporting grooves 44 and 45 to be corresponded to each other. Next, the hook-fixing portion 46 serves to couple the lower case 2 with the upper case 1 in a manner that the first and second supporting end portions 44 and 45 are fitted into the first and second supporting grooves 44 and 45.

Returning to FIG. 1, the frame 4 is made of single metal plate materials and easily manufactured by a press processing, which is coupled with the release button 3. The frame 4 includes a hook portion 62 projected forward from the front portion of a lower plate 61, an arched supporting beam 63 vertically elected at the front portion, upstanding side walls 64 projected from both side ends thereof. The arched supporting beam 63 includes an opening at the center of its front surface, a first projecting piece 66 projected from the upper center thereof and a guide jaw 67 extended and bent downward from its front portion to guide the tongue thereinto. The release button 3 is coupled with the frame 4 in a manner that a first spring 68 is inserted onto the first projecting piece 66 at one end, and a hook of the hook portion 62 is passed through the guider 3' to allow the release button 3 to be moved on the hook portion 62.

The lower plate 61 includes a sliding aperture 69 formed to move the ejector 5 along the lengthwise portion thereof and coupling hole 65 for mounting a connector 70 (referring to FIG. 6) therein by an anchor. A second projecting piece 63 is projected inward from the rear portion of the sliding aperture 69, and a coupling surface 74 is formed adjacent the rear portion of the sliding aperture 69 to be coupled with the hook 27 of the multi-purpose buckle sensor assembly 10.

The upstanding walls 64 include a stopper groove 75 and a hinge groove 76 formed at the rear portion of its upper portion, in which a hinge projection 77 is projected inward from the hinge groove 78 (referring to FIG. 6). A coupling groove 78 is formed behind the hook portion 62 on the bottom 50 to prevent the front portion of the multi-purpose buckle sensor assembly 10 from being rocked.

The ejector 5 includes a guiding groove 81 formed on both side surfaces to allow a part of a lower plate 61 adjacent the sliding aperture 69 to be inserted thereinto, a contacting portion formed as a front surface in an arc shape to be contacted with a tongue and two separation-preventing portions 83 projected out of the front surface thereof to prevent the separating of the tongue contacted corresponding to the contacting portion 82. A receiving portion 74 is formed at the rear portion of the ejector 5 to receive the other end of the second spring 72 elastically supported in the sliding aperture 69. A second permanent magnet 85 is mounted on the center to cooperate with the hall sensor of the hall sensor portion 11. A pair of leg portions 86 is formed on the lower surface of the ejector 5 adjacent both guide grooves 81, which are fitted into the groove portions 33 to force the movable member 13 to be moved on the base plate 12 according to the movement of the movable member 13.

The locking lever 6 includes a coupling surface 91 coupling with the upper rear surface of the arched supporting beam 63, from the center of which a bending portion 92 is projected downward. A locking bar 93 is extended downward more than the bending portion 92 enough to be coupled with the tongue inserted into the insertion opening of the arched supporting beam 63. A guide surface 94 is extended rearward from the coupling surface 91 to formed both side surfaces of the locking lever 6 and enable the slider 7 to be moved thereon. A stopper 95 and a hinge portion 96 are formed on the rear portion of the locking lever 6 to be respectively coupled into the stopper groove 75 and the hinge groove 76. An aperture is formed behind the guide surface 94 to mount a third spring 98 therein with one end being inserted into a third projecting piece 97. The third spring 98 is arranged on the aperture with the other end being coupled to the slider 7.

The slider 7 includes a guide rail 87 formed on the lower surface thereof to be movably inserted onto both end portion of the guide surface 94 and a fixing piece 88 formed on the rear portion thereof to be fixed to the other end of the third spring 98. The slider 7 is positioned on the guide surface 94 with the guide rail 87 being inserted into both side ends thereof and the third spring 98 elastically supporting the slider 7 between the third projecting piece 93 and the fixing piece 92. At that time, the slider 7 is contacted at the coupling surface 89 with the upper rear surface of the arched supporting beam 63 in an initial assembling state. The slider 7 further includes a hooked hanger 90 and is moved rearward along the guide surface 94 upon the backward motion of the ejector 5. At the same time the hooked hanger 90 is moved downward with being hung on the front surface of the arched supporting beam 63, so that the coupling surface 89 is introduced into the aperture of the arched supporting beam 63.

On the other hand, the buckle assembly is assembled as follows: the ejector 5 is assembled to be electrically supported in the sliding aperture 69, whereby the guide grooves 81 are fitted into the lower plate 61 adjacent the sliding aperture 69 and the second spring 72 is arranged at one end to be coupled into the receiving portion 84 and at other end to be fitted into the second projecting piece 73.

Next, the slider 7 is assembled on the locking lever 6 in a manner to movably mount the guide rail 87 onto the side end portion of the guide surface 94 with the third spring 98 being elastically arranged between the fixing piece 88 and the third projecting piece 93. The locking lever 6 is mounted on the upper portion of the frame 4 so that the stopper 95 is inserted into the stopper groove 75 to prevent the advance thereof, and the hinge portion 96 is seated in the hinge groove 76 to pivotally rotate the locking lever 6 downward or upward about it. At that time, the hinge projection 77 prevents the accidental separation of the locking lever 6 out of the hinge groove 66.

In order to mount the buckle assembly over the multi-purpose buckle sensor assembly 40 by the reference of the positioning member 27, the positioning member 29 is fitted into the coupling groove 78 and the leg portions 81 are coupled into the groove portions 34, respectively. The hook member 28 is engaged with the coupling surface 74 on the rear portion of the sliding aperture 69 on the lower plate 61. So, the multi-purpose buckle sensor assembly 10 and the buckle assembly are mounted at the same time in the lower case 2.

As shown in FIGS. 4A and 4B, in the lower case 20, a multi-purpose buckle sensor assembly 10 is mounted on the bottom 61 so that a position determining projection 53 determines its mounting position by being fitted into a hole 19, a first supporting block 49 supports a base plate 12 and a second supporting block 50 supports a terminal block 14. A cable 15 having control lines and power lines are arranged between guide walls 52 to pass therethrough.

The buckle sensor assembly is associated with the multi-purpose buckle sensor assembly 10 for their simultaneous operating. A guide jaw 67 is placed on the inner upper portion of a front wall 41. A positioning member 27 is fitted into a coupling groove 78 (referring to FIG. 1), a coupling surface 74 is engaged with a hook portion 28 and a connector 8 placed on a coupling hole 65 is fixed a bottom 61 by an anchor to mount the buckle assembly in a vehicle. An ejector 5 is mounted in a sliding 69 so that a pair of leg portion 76 is respectively fitted into groove portions 46 to reciprocate a movable member 13 on a base plate 12.

Herein, it is noted that a first permanent magnet 31 leads to the operating of a hall sensor in a ball sensor portion 11 according to the movement of the movable member 13, so that a pair of contact terminals 32 selects predetermined terminals of a metal pattern to lighten or put out a warning lamp mounted on an instrument panel. An elector 5 includes a second permanent magnet 85 at the center thereof, which is placed close to the hall sensor of the ball sensor portion 11 at an initial position along with a first permanent magnet 31.

Figure 6A:
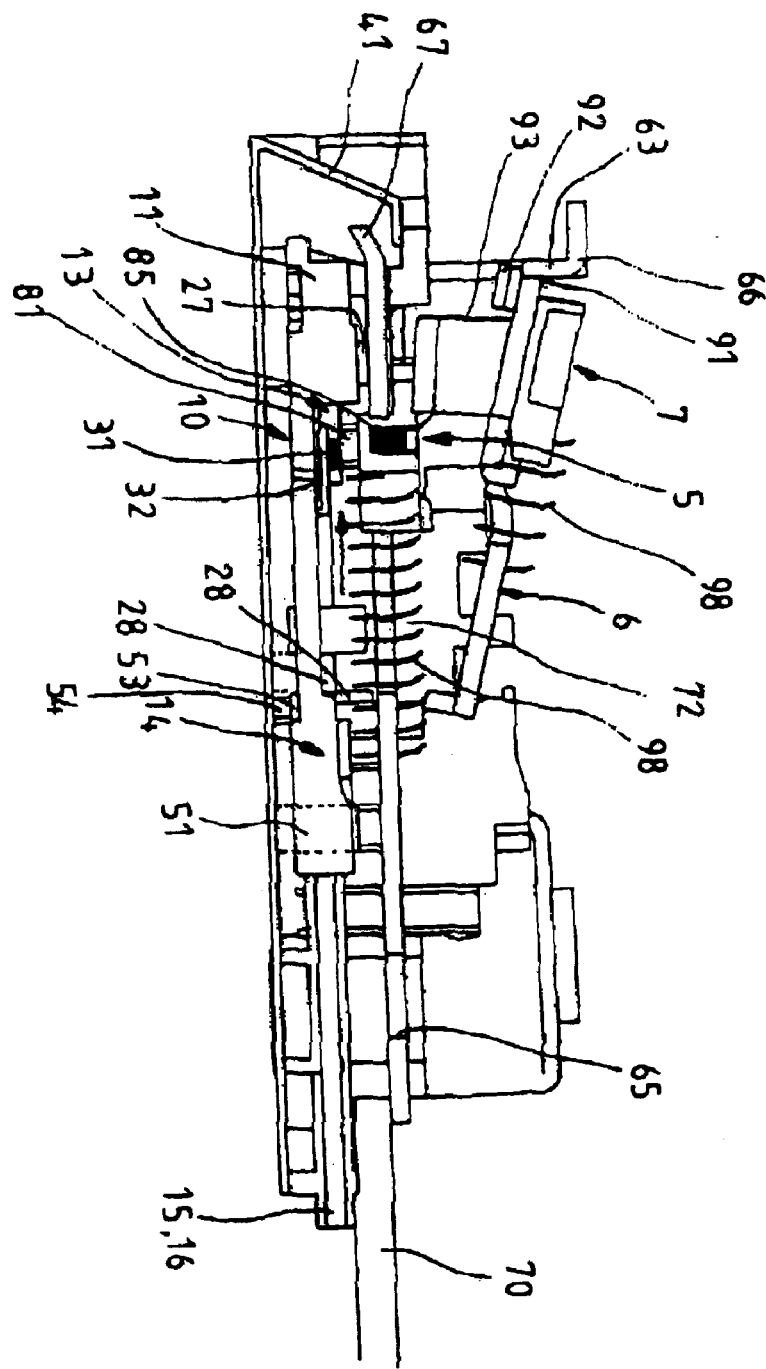

Therefore, as shown in FIG. 6A, the buckle assembly is coupled with the multi-purpose buckle sensor assembly 10 at first state, so that the first and second permanent magnets 31 and 85 are placed adjacent the hall sensor portion 11. In that case, a pair of contact terminal 32 forces a power source of power lines 16 to be applied to the warning lamp based on the metal pattern 23, thereby lightening it and warning the non-wearing of a seatbelt to occupants. At the same time, the hall sensor generates control signals to apply them through a cable 15 to an electronic control unit, so that other safety apparatuses such as an airbag system, etc. stand ready for corresponding safety operating.

Figure 6B:
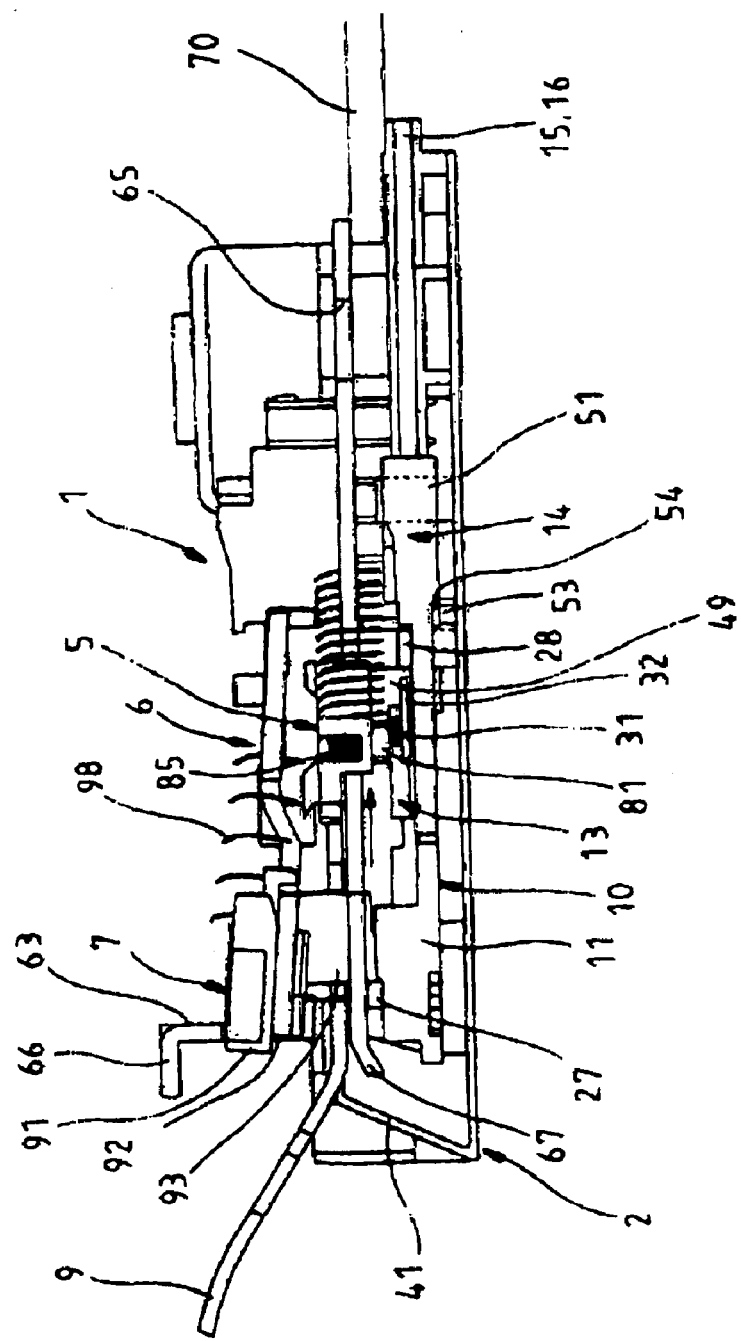

As shown in FIG. 6B, as a tongue 1 is inserted into an insertion opening over a front wall 41, the ejector 5 is moved backward along with the movable member 13. The locking lever 6 is moved downward at the front-end portion thereof to insert the opening of the arched supporting beam 63. And then a locking bar 93 is inserted into a center aperture of the tongue 9 to lock it to the buckle assembly. Therefore, the first and second permanent magnets 31 and 85 are placed adjacent the hall sensor portion 11. Therefore, the first and second permanent magnets 31 and 85 are placed away from the hall sensor portion 11. The hall sensor 21 generates another control signal to apply them through the cable 15 to the electronic control unit based on the metal pattern 23, so that other safety apparatuses such as an airbag system, etc. release the stand by state for corresponding safety operating. At the same time, the power source of the power line 16 is interrupted to put out the warning lamp, which represent the wearing of the seatbelt.

As described above, the invention enables the mounting of a multi-purpose buckle sensor assembly in a case to enhance the space efficiency, and the operations of contact and non-contact switches happens simultaneously cooperating with each other.

What is claimed is:

1. A seatbelt buckle assembly including an upper case, a lower case coupled with the upper case and including a position determining projection for determining the position of a multi-purpose buckle sensor assembly, ribs for supporting a front portion of the multi-purpose buckle sensor assembly and first and second supporting blocks each positioned on the front portion of a terminal block and inserted in a groove portion of the terminal block, a release button coupled to the frame for unlatching a locking bar of a locking lever from a tongue, an ejector elastically and movably supported in a sliding aperture for discharging the tongue latched to a locking bar of a locking lever out of outside responsive to the release button, the locking lever including a slider elastically and movably mounted on a guide surface thereof and for being pivoted at one end portion and latching or unlatching the tongue at the other end portion, a frame including a coupling groove for determining the position to be coupled with the multi-purpose buckle sensor assembly and a coupling surface to be engaged with a hook portion of a base plate and for supporting the ejector on a bottom thereof, supporting the slider against the inner upper surface of an arched supporting beam thereof and pivotally rotating the locking lever at its rear end, said seatbelt buckle assembly comprising:

a multi-purpose buckle sensor assembly comprising a hall sensor portion including a hall sensor and a printed circuit board electrically connected to each other, enclosed in one package;

a base plate including a metal pattern with a plurality of terminal portions for control signal and power sources of a positive voltage and a negative voltage, each of the terminal portions having a certain pattern adaptable formed adjacent a terminal block to an electronic circuit, and a supporting plate including a plurality of terminal seats for connecting connecting ends of control and power lines to the terminal portions;

a movable member including guiding means for freely moving the movable member on the base plate cooperating with the ejector, a first permanent magnet mounted at its center portion and a pair of contact terminals mounted on its lower surface and for being traveled on the metal pattern contacting with at least one pattern of the metal pattern; and, a terminal block made of a heat-melted material in the form of a fork having three branches at the front portion and including at least one branch enclosing the connecting ends of the control and power lines electrically coupled to each other with the control terminal portions in corresponding power terminal seats.

2. The seatbelt buckle assembly of claim 1, wherein:

the hall sensor is electrically connected to the printed circuit board to form a certain control circuit, in which the printed circuit board is electrically coupled with at least one pattern of terminal portions of the metal pattern.

3. The seatbelt buckle assembly of claim 1, wherein:

the movable member includes at least two contacting terminals for generating various control signals and the first permanent magnet oriented in the same pole as a second permanent magnet mounted on the center of the ejector to be cooperated with the hall sensor.

4. The seatbelt buckle assembly of claim 1, wherein:

the terminal block is heat-molded into the heat-melted material of a lower temperature with control and power lines contained, in which the connection ends of the lines and corresponding terminal portion are placed on their corresponding terminal seat.

5. The seatbelt buckle assembly of claim 1, wherein:

any one of the first permanent magnet and a second permanent magnet is used to be cooperated with the hall sensor portion.

\* \* \* \* \*